US006805757B1

(12) United States Patent
Windhager et al.

(10) Patent No.: US 6,805,757 B1
(45) Date of Patent: Oct. 19, 2004

(54) CASTING MATERIAL FOR INDEFINITE ROLLERS WITH SLEEVE PART AND METHOD FOR PRODUCING THE SAME

(75) Inventors: Michael Windhager, St. Gallen (AT); Bernhard Feistritzer, Tenneck (AT); Karl-Heinrich Schröder, St. Martin (AT); Karl-Heinz Ziehenberger, Tenneck (AT)

(73) Assignee: Eisenwerk Sulzau-Werfen R. & E. Weinberger AG, Tenneck (AT)

( * ) Notice: Subject to any disclaimer, the term of this patent is extended or adjusted under 35 U.S.C. 154(b) by 0 days.

(21) Appl. No.: 09/869,310

(22) PCT Filed: Apr. 20, 2000

(86) PCT No.: PCT/AT00/00102

§ 371 (c)(1),
(2), (4) Date: Nov. 13, 2001

(87) PCT Pub. No.: WO00/65118

PCT Pub. Date: Feb. 11, 2000

(30) Foreign Application Priority Data

Apr. 22, 1999 (AT) ............................................. 720/99

(51) Int. Cl.$^7$ ............................................. C22C 37/08
(52) U.S. Cl. ........................ 148/324; 420/109; 420/124; 492/58
(58) Field of Search ........................ 148/324; 420/109, 420/124; 492/58

(56) References Cited

U.S. PATENT DOCUMENTS

| 5,305,522 A | * | 4/1994 | Nawata et al. ............ 29/895.32 |
| 5,536,230 A | | 7/1996 | Werquin et al. |
| 5,738,734 A | | 4/1998 | Sawa et al. |

FOREIGN PATENT DOCUMENTS

| EP | 0525932 | 2/1993 |
| EP | 0665068 | 8/1995 |
| EP | 0760398 | 3/1997 |
| JP | 1287248 | 11/1989 |
| JP | 8109434 | 4/1996 |
| WO | 94/11541 | 5/1994 |
| WO | 96/39544 | 12/1996 |

OTHER PUBLICATIONS

An English Language abstract of JP 1–287248.
An English Language abstract of JP 8–109434.

* cited by examiner

Primary Examiner—George Wyszomierski
Assistant Examiner—Janelle Morillo
(74) Attorney, Agent, or Firm—Greenblum & Bernstein, P.L.C.

(57) ABSTRACT

A method of the production and processing of alloyed casting material for a working part of an indefinite chill roll, a corresponding casting material and a composite indefinite chill roll incorporating the casting material. The method comprises providing a melt of a certain composition, casting the melt and subjecting the resultant body to a heat treatment. The composition of the melt is adjusted so as to afford a certain graphite and carbide distribution.

27 Claims, 2 Drawing Sheets

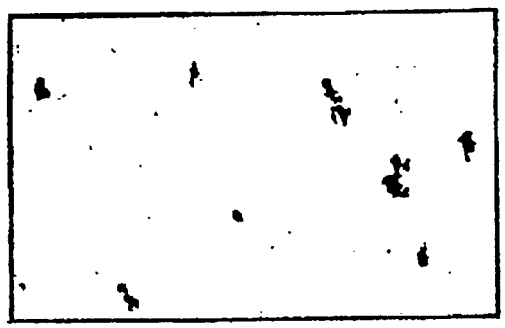 
Fig. 3    50 ×    Fig. 4

CASTING MATERIAL FOR INDEFINITE ROLLERS WITH SLEEVE PART AND METHOD FOR PRODUCING THE SAME

CROSS-REFERENCE TO RELATED APPLICATIONS

The present application is a U.S. National Stage of International Application No. PCT/AT00/00102 filed Apr. 20, 2000 which claims priority under 35 U.S.C. §119 of Austrian Patent Application No. A 720/99, filed Apr. 22, 1999.

BACKGROUND OF THE INVENTION

1. Field of the Invention

The invention relates to a method for the production of alloyed casting material, in particular of material for the working area of indefinite chill rolls, containing the elements carbon, silicon, manganese, chromium, nickel, molybdenum, vanadium, and optionally also other elements of group 5 of the periodic system, aluminum, and the remainder iron and impurities related to the manufacturing process.

The invention further relates to a casting material containing the elements listed above.

Finally, the invention includes a composite indefinite chill roll, especially for work rolls for forming flat steel, comprising a work or sleeve part made of a casting alloy with little tendency to adhere or weld to the rolling stock and of a high-strength core part made of low-alloy cast iron, especially of ductile iron.

2. Discussion of Background Information

Tools or machine parts that are exposed to numerous stresses of different types require a special set of properties. For this reason, the most appropriate materials and manufacturing process must be selected for each case with regard to feasibility and economical manufacture as well as the service life of the parts in practical use.

Parts which are exposed to varying temperatures above room temperature, especially for hot forming of workpieces, are made of casting materials in many applications. As a result of such a choice of material, distortion due to local differences in temperature can advantageously be minimized to a great extent, the manufacture of the parts can be made economical, and the material properties can be largely matched to the stresses.

Work rolls used for hot rolling of steel, for example, rolls in wide-strip hot rolling mills, especially in Steckel stands and in the finishing stands, on the one hand, are exposed to high mechanical and thermal stresses and, on the other hand, must exhibit the least possible tendency toward sticking and welding to the rolling stock. Specifically, the thinner the hot strip is rolled, the higher the specific contact pressures become between the work roll and rolling stock, which significantly increases a tendency toward adhesion of the strip to the roll surface, enhanced by the low final roll temperatures of the last stands. This sticking or welding of the roll surface to the strip can lead to tearing of material out of the strip, which in and of itself and through its adhesion to the roll can lead to further rolling defects, which often perforce leads to a reduced quality in the hot rolled strip.

It is known to use an indefinite chill cast material in the working area of the rolls in the last stands of a hot strip rolling mill in order to meet the requirements regarding a reduction of friction in the roll gap and reduction of a tendency of the strip to stick to the roll surface, and also to increase the resistance to stripping and thermal shock damage to the material.

The indefinite chill quality comprises three essentially different structural constituents that are formed as cast, specifically graphite, carbides, and a steel-like matrix. Only the matrix can be significantly altered by heat treatment. The indefinite chill roll quality and/or alloy forms a large amount of carbide and little graphite in the structure when solidification is rapid, and at lower solidification rates the relationship is reversed, i.e., less carbide and more graphite is formed. This has the consequence that rapidly solidified material is harder and slowly solidified material is softer. In an indefinite chill roll, this has the effect that the carbide content drops as the distance from the cast surface increases, the graphite content rises, and the hardness likewise decreases. Since no defined jump in hardness can be observed in this case, this quality has been named "indefinite."

However, graphite precipitation can degrade the hardness and especially the wear properties of the material, so the microstructure should also contain hard carbides to minimize this disadvantage.

It is known to one skilled in the art to create a cast structure with graphite particles and carbides using alloying methods, where the content of elements that promote graphite formation, primarily nickel and silicon, and the content of carbide formers, primarily small amounts of chromium and molybdenum, as well as the carbon content in the melt must all be coordinated with one another and where their interactions during solidification must also be taken into account.

According to the prior art, indefinite chill rolls have a composition in wt-% of 2.6 to 3.6% carbon, 0.6 to 1.1% silicon, 0.6 to 1.0% manganese, 1.5 to 2.1% chromium, 4.1 to 4.6% nickel, 0.3 to 0.5% molybdenum, with the remainder being iron, accompanying elements, and impurities. The structure of the working body or the jacket of a composite roll is primarily composed of a bainitic and/or martensitic matrix with constituents of 28 to 40% of eutectic carbides and 1.3 to 2.2% graphite by volume, with 5 to 20 graphite particles being present per $mm^2$ of polished surface.

In order to improve the performance characteristics of indefinite chill rolls, especially to increase their wear resistance in the working area, attempts have already been made (PCT/GB 93/02380) to introduce preferable surface-layered carbide particles of greater hardness into the melt provided for this purpose. It is known to practitioners of the art that small amounts of high-hardness carbides increase wear resistance of the material more than the increase produced by typical-quality carbides of lower hardness. If the roll or the roll jacket is made from a melt of this type by means of a centrifugal casting process, undesirable segregation and inhomogeneities can be produced as a result of the centrifugal force and the differences in specific gravity between the carbide particles and the melt. Furthermore, the formation of the necessary graphite can be disrupted by the change in the melt.

The proposal was made according to PCT/US 96/09181 to add 0.3 to 6.0 wt-% Nb to a melt having a balanced composition for indefinite chill rolls and to correspondingly increase the carbon content stoichiometrically with respect to the niobium carbide to be formed. While this process does increase the carbide content and the wear resistance of the material, higher niobium contents can lead to primary formation of carbides which can result in coarsening of the carbide grains and the graphite particles.

During the centrifugal casting of the working area of an indefinite chill roll, the alloy in the mold is subjected to a high centrifugal acceleration during solidification, for example, in the range of 80 to 108 g. Since the monocarbides of vanadium that are primarily formed in the melt have a lower density than the liquid metal, and those of niobium have a higher density, segregation and/or demixing can occur. A proposal has already been made (U.S. Pat. No. 5,738,734) to prevent segregation by alloying the melt equally with vanadium and niobium in such a manner that the monocarbides formed during solidification are mixed carbides (VNb)C and have essentially the same density as the melt. As a result of the highest possible content for the monocarbide-forming elements of 17 wt-% per the above U.S. Patent, the carbon concentration must also be adjusted according to the known relationship. However, such an alloy can exhibit an undesirable solidification structure with localized demixing and large graphite particles, which can produce impaired surface quality of the roll after even a short operating time, and also increases the tendency to stick.

SUMMARY OF THE INVENTION

Based on the prior art, the object of the invention is to specify a new, improved process by means of which the material of the working area of indefinite chill rolls has a significantly reduced tendency to stick or weld to the rolling stock and a consistently high abrasion resistance over the thickness of the area used.

The invention has the additional goal of producing a casting material that has finely dispersed and homogeneously distributed graphite precipitations with a low volume fraction, has special carbides with uniformly small grain diameter likewise uniformly distributed through the base material, and also has essentially unchanged working surface characteristics in the event of wear.

Lastly, the invention has achieved the object of producing composite indefinite chill rolls having significantly improved working characteristics and reduced danger of roll breakage, stripping and cracking in the core transition region.

This object is attained in a generic process in that:

A. A melt is produced that has a chemical composition in wt-% of
2.0 to 3.5 C
1.0 to 2.0 Si
0.5 to 2.0 Mn
1.0 to 3.0 Cr
3.5 to 4.9 Ni
0.2 to 2.9 Mo
with the remainder iron and impurities, and B. More than 0.5 wt-% vanadium in amounts up to 5.9 wt-% is added, is dissolved therein, and C. The composition of the melt is set using alloying methods by fixing the concentrations of carbon and silicon in the presence of nickel and the effective sum of the carbide forming elements in such a manner that, at its solidification, a microstructure is formed which exhibits 1.0 to 3.0 vol-% of graphite, with the guideline that more than 20 and less than 100 graphite particles are present per $mm^2$ of observed surface in a metallographic section and the remainder is primarily composed of martensite, 8 to 35 vol-% of eutectic carbides, and at least 1 vol-% of finely distributed vanadium carbides, after which D. The melt is cast in a form, preferably a centrifugal casting form, and is allowed to solidify into a body, preferably a working body of a roll, and if necessary the cast body is further processed, for example, into a composite roll, with the body or roll that has been produced in this manner being E. Subjected to heat treatment including at least one onetime heating to a treatment temperature, holding at this temperature, and cooling to room temperature.

The advantages achieved by the invention lie essentially in the fact that the solidification kinetics of the melt and the structural morphology of the material have been set so as to be advantageously changed. This change is achieved through the synergistic effect of the alloying elements in the specified concentrations, where a high number of small graphite particles is made possible by a slight increase, as compared to the prior art, in the silicon content and also aluminum in the presence of nickel in within tight limits. In this context, however, the effective total of the carbide-forming elements during eutectic solidification is important, where chromium and molybdenum in the provided concentrations were found to be critical influencing variables. Because at least some of the vanadium carbides are precipitated prior to eutectic solidification to the solubility limit of vanadium in the liquid alloy, it is important for these monocarbides to have a small particle size and thus to be incapable of segregating in the melt during solidification as a result of the applied centrifugal acceleration. According to the current state of knowledge, the fine-grain nature of the primary dispersed carbide precipitation is achieved through the interaction of carbon, silicon and nickel, on the one hand, and chromium, molybdenum and vanadium, on the other hand. These interactions of the activities of the elements are still not completely understood by science, but it can be assumed that advantageous precipitation kinetics are achieved during solidification and that with appropriate silicon content and nickel concentrations in the remaining melt the precipitation of graphite and eutectic carbides is delayed and that fine-grain residual solidification takes place once greater supercooling is achieved. The composition of the melt here should be set in such a way that the graphite portion in the solidified material is 1.0 to 3.0 vol-%. Lower graphite percentages increase the tendency of the rolling stock to stick to the roll surface even at a high graphite particle density of over 20 per $mm^2$. When the graphite content exceeds 3.0 vol-%, roll wear increases. Moreover, a content of between 8 to 35 vol-% of eutectic carbides and a content of at least 1 vol-% of special carbides or monocarbides is to be produced by alloying methods. Carbide proportions below 8 and 1 vol-% lead to reduced wear resistance of the material, and more than 35 vol-% of eutectic carbides increases the risk of cracking or breakage.

Particularly pronounced crazing resistance as well as surface quality with low roll wear in operation can be achieved when the composition of the melt is established by alloying so that a microstructure is formed at solidification which has 1.2 to 2.5 vol-%, preferably 1.25 to 1.95 vol-%, of graphite with the guideline that more than 22 but no more than 90 graphite particles are present per $mm^2$ of observed surface in a metallographic section and the remainder is primarily composed of martensite, 10 to 25 vol-% of eutectic carbides, and 2 to 20 of finely distributed monocarbides.

When, according to a preferred refinement of the invention, the composition of the melt is set such that, in the presence of nickel, the concentration ratio of carbon to silicon is less than or equal to 2.6, preferably less than or equal to 2.0, the graphite precipitation and/or the graphite fraction in the material can be held within the desired range with high precision and within tight limits. At a ratio of carbon content to silicon content that exceeds 2.6, coarse primary carbides are formed and graphite formation is adversely affected as well.

In the optimization of material properties and material quality, although it is advantageous for the carbon content of the melt to be set to a value of 2.2 to 3.1 wt-%, preferably 2.6 to 2.95.

In the interests of an especially good balance of the graphite and carbide distribution during solidification, and in order to further improve the operating characteristics of the roll, it has been proven favorable for a final silicon content of more than 1.2 to 1.95 wt-%, preferably 1.4 to 1.75, to be provided.

The element aluminum fosters the tendency toward graphite formation, on the one hand, but also causes fine-grain precipitation of special carbides, on the other hand. Aluminum can also partially replace silicon in terms of action kinetics and find application as a control element for a balanced graphite/carbide precipitation so that, when setting the composition of the melt by alloying means, aluminum can be added at 0.002 to 0.65 wt-% and dissolved therein. Aluminum contents of 0.005 to 0.04 wt-% are preferred.

The establishment of high material quality in tight limits is favorable when the nickel content of the melt is set to a value of 3.51 to 4.7 wt-%, preferably 4.15 to 4.6 wt-%

In terms of solidification kinetics, but also with regard to the formation of a large number of graphite particles, it has proven advantageous for the concentration ratio of molybdenum to chromium to be less than 1.0, preferably less than 0.8.

Mo/Cr<1.0, preferable<0.8

If the ratio exceeds 1.0, high transformation stresses can arise during cooling and heat treatment of the composite roll, which can lead to material separation. This danger is greater with smaller rolls; however; for reasons of safety from cracking it is always advantageous to set the ratio of chromium content to molybdenum content below 0.8.

In the interest of the deliberate formation of eutectic carbides and thus the reduction of the risk of breakage of the roll material under impact stresses, it has proven advantageous for the content of chromium and molybdenum in the melt in wt-% to be set to the values of chromium 1.2 to 2.6, preferably 1.5 to 2.01
molybdenum 0.20 to 2.6, preferably 0.3 to 0.9.

Manganese serves primarily to bind sulfur, where it is advantageous for the manganese content in the melt to be set to a value in wt-% of 0.6 to 1.6, preferably 0.7 to 1.45.

In order to further promote a finely dispersed distribution of graphite particles, and to keep the grain size of the special carbides uniformly small, and thus improve the working properties of an indefinite chill roll, even under frequent abrasion, it can be of further advantage for 1.8 to 3.9 wt-%, preferably 1.9 to 2.9 wt-%, of vanadium to be added to the melt and dissolved therein.

It can also be advantageous when some of the vanadium is replaced by additional elements from group 5 of the periodic system in an amount of less than 0.6 wt-%, and mixed carbides are formed. In the end, the prescribed material properties are achieved by means of heat treatment. In the course of the method according to the invention, it has proven advantageous for the cast body or the roll to be subjected to a heat treatment including at least one heating from room temperature to a treatment temperature of 400° C. to 500° C., preferably 460° C. to 480° C., holding at this temperature for at least two hours, preferably at least 8 hours, and cooling to room temperature, optionally with a tow-temperature treatment.

The further object of the invention is achieved with a casting material of the initially described type in that the alloy contains, in wt-%,
0.5 to 5.9 V
1.0 to 2.0 Si
0.5 to 2.0 Mn
1.0 to 3.0 Cr
3.5 to 4.9 Ni
0.20 to 2.9 Mo
2.0 to 3.5 carbon with the guideline that
1.0 to 3.0 vol-% is present as graphite particles with a distribution of more than 20 and less than 100 graphite particles per $mm^2$ of metallographic polished surface of the material.

The advantage of the material thus formed is its special suitability for construction of indefinite chill rolls, and can largely be observed in that, as compared to the prior art, a very constant graphite proportion is achieved with similar properties of the material. Due to the high graphite particle density brought about by alloying methods, the tendency of the rolling stock to weld or adhere to the surface of the roll is reduced significantly. A particle count below 20 per $mm^2$ of observation surface does not demonstrate sufficient effect, however. The same applies when the number of graphite particles is above 100 per $mm^2$ because then the diameter of the individual particles is too small to reduce the tendency to adhere to the required degree. For a high graphite particle count and a fine eutectic solidification with small special carbides, it is necessary for the vanadium content to be greater than 0.5 wt-% because smaller concentrations do not achieve effective structural refinement. In order to achieve formation of finely dispersed graphite particles and to maintain a desired solidification and structural arrangement when the requisite carbon content is present, it is also necessary to provide the elements silicon in the presence of nickel and also chromium and molybdenum within tight concentration limits, because these elements interact kinetically. However, a high vanadium content leads to coarse primary carbide precipitation of the MC type, and can cause increased fracture risk and flaking of the large carbides out of the working surface, so the concentration of this element in the material should not exceed the value of 5.9 wt-%.

The service properties of the roll can be advantageously further improved when the alloy contains
1.8 to 4.8 wt-% of elements of the vanadium group of the periodic system
2.2 to 3.1 carbon with the guideline that
1.2 to 2.5 vol-% of graphite is present as particles with a distribution of more than 22 particles and less than 90 particles per $mm^2$ of a metallographically polished surface. If the graphite particle count of 100 per $mm^2$ of image surface is exceeded for a graphite content of 1.8 vol-%, the tendency of the rolling stock to stick to the roll surface increases significantly.

High quality assurance, especially with regard to the transformation behavior of the material, is achieved when the alloy contains, in wt-%,
2.0 to 3.5 carbon
1.0 to 2.0 silicon
0.5 to 2.0 manganese
1.0 to 3.0 chromium
3.5 to 4.9 nickel
0.2 to 2.9 molybdenum
1.5 to 4.9 vanadium
with the remainder iron and impurities.

Furthermore, as became evident, it is advantageous in the formation according to the invention of the material composition with regard to a homogeneous and finely dispersed graphite particle formation as well as improved service properties of an indefinite chill roll if the alloy has a concentration ratio of carbon to silicon of less than or equal to 2.6, preferably less than or equal to 2.0, where the presence of nickel is provided.

It has proven advantageous, both for especially fine graphite and carbide formation as well as for balanced eutectic graphite/carbide precipitation, for the alloy to contain greater than 1.2 to 1.85 wt-% of silicon, preferably from 1.4 to 1.75 wt-%.

Aluminum, in content levels from 0.002 to 0.65 wt-%, preferably from 0.005 to 0.04 wt-%, can advantageously ensure a desired graphite and carbide formation as well as a fine solidification structure of the cast body.

With regard to a controlled graphite content and an intended assumption of hardness of the material, it is preferred for the alloy to contain 3.5 to 4.9 wt-% of nickel, preferably 4.15 to 4.6 wt-%.

In order to bind the sulfur, the alloy can beneficially contain 0.6 to 1.6 wt-%, preferably 0.6 to 1.6 wt-%, of manganese.

Both the solidification morphology and the transformation behavior of the sleeve material can be improved, and the risk of cracking of the composite roll can be reduced, when the alloy has a concentration ratio of molybdenum to chromium of less than 1.0, preferably less than 0.8. In this way, the inner stresses of a roll are significantly reduced. This applies to vanadium content levels of up to 5.9 wt-% and only low content levels of further elements from group 5 of the periodic systems. The proportion of eutectic carbides in the roll material can be advantageously developed by content levels in wt-% of 1.5 to 2.01 of chromium and concentrations from 0.3 to 0.9 of molybdenum, especially with a carbon content from 2.6 to 2.95 wt-%.

When the alloy contains 1.8 to 4.0 wt-% of vanadium, preferably 1.9 to 2.95 wt-%, favorable resistance to wear with high material hardness and an improved structural transformation behavior of the material are achieved at the same time.

It is also possible to replace some of the vanadium content with other monocarbide-forming elements from group 5 of the periodic system in amounts less than 0.6 wt-%. At niobium or tantalum concentrations in the alloy of 0.6 wt-% and greater, coarse phases may be formed in the structure which worsen the properties of the working roll and the surface quality of the rolling stock.

Finally, improved resistance to breakage and a low stripping tendency with improved wear characteristics of the cast material can be achieved if the cast material possesses, in vol-%, 8 to 35, preferably 10 to 25, eutectic carbide and
1 to 15, preferably 2 to 10, carbides from group 5, the vanadium group, of the periodic system.

The further object of the invention, namely to specify composite indefinite chill rolls of the generic type produced with the centrifugal casting process and having significantly improved working characteristics and reduced danger of roll breakage, stripping, crazing and cracking in the transition region to the core, is achieved in that the working area or sleeve has a thickness of 10 to 150 mm, and the sleeve material has a structure comprising primarily of 1.0 to 2.5 vol-% of graphite, where the latter is present in finely dispersed form with a graphite particle count of more than 20 particles per $mm^2$ of a metallographic polished surface, and of 8 to 35 vol-% of eutectic carbides, of 1 to 20 vol-% of vanadium carbides that are uniformly distributed, especially in the direction of the sleeve thickness, with the remainder being essentially martensite and constituents related to impurities or the manufacturing process, and has a hardness between 70 and 90 ShC. The advantage of the rolls according to the invention is essentially that the sleeve metallically bound to the core with high strength has a high graphite particle count, which particularly effectively prevents adhesion or welding of the rolling stock during roll operation. This homogeneous graphite formation and the uniform distribution of the small vanadium special carbides is achieved by using alloying methods to influence the solidification kinetics so that demixing due to so-called centrifugal segregation cannot take place during the centrifugal casting process. Thus, in an advantageous fashion, the structural arrangement and the roll performance are largely the same after every instance of reworking the working surface, even in the event of necessary radial grinding. The roll performance in each case up until a necessary reworking of the surface is advantageously improved because the high graphite particle density effects an increased crazing resistance as well as an improved surface quality of the sleeve, which is more wear-resistant as a result of the special carbides.

Improved properties of a roll according to the invention can be attained with certainty when the working area or sleeve material has a structure which contains 1.0 to 2.5 vol-% of graphite, with the guideline that its distribution density is at least 22 particles but less than 100 graphite particles per $mm^2$ of polished surface in a metallographic section, contains eutectic carbides in an amount of 10 to 25 vol-%, and 2 to 10 vol-% of special carbides of the elements of group 5 of the periodic system If, according to a preferred material variant, the working or sleeve material has a composition, in wt-%, of
C=2.0 to 3.5, preferably 2.21 to 3.1, especially 2.6 to 2.95
Si=1.0 to 2.0, preferably over 1.2 to 1.85, especially 1.4 to 1.75
Mn=0.5 to 2.0, preferably 0.6 to 1.6, especially 0.7 to 1.4
Cr=1.0 to 3.0, preferably 1.3 to 2.5, especially 1.5 to 2.01
Ni=3.5 to 4.9, preferably 3.5 to 4.7, especially 4.15 to 4.6
Mo=0.2 to 2.9, preferably 0.25 to 1.3, especially 0.3 to 0.9
Al=0.002 to 0.65, preferably 0.005 to 0.1, especially 0.005 to 0.04
V=0.5 to 5.9, preferably 1.8 to 3.9, especially 1.9 to 2.9
optionally, Nb and/or Ta less than 0.6
with the remainder being iron and impurities
and the roll core is formed of ductile iron, then high resistance to wear, reduced danger of crack formation and crack propagation, and high hardness of the working area of the roll are assured.

High protection from the initiation of cracks can be achieved when the binding zone between the sleeve or working area and the roll core of low-alloy cast iron, preferably of ductile iron, has, in the radial direction, a bending strength (3-point bending test) of greater than 600 $N/mm^2$.

The present invention provides a method for the production and processing of alloyed casting material for a working part of an indefinite chill roll. This method comprises providing a melt having a composition comprising, in wt-%, 2.0 to 3.5 carbon, 1.0 to 2.0 silicon, 0.5 to 2.0 manganese, 1.0 to 3.0 chromium, 3.5 to 4.9 nickel, 0.2 to 2.9 molybdenum, with the remainder being iron, accompanying elements, and impurities related to the manufacturing process. Added to and dissolved in the melt are more than 0.5 and up to 5.9 wt-% of vanadium. The vanadium may in part be replaced, in an amount of less than 0.6 wt-%, by niobium and/or tantalum. The resultant melt is cast into a mold and allowed to solidify into a body, which body is subjected to a heat treatment which comprises heating to a treatment temperature, holding at this temperature, and cooling to room temperature. In this method, the composition of the melt is set using-alloying methods by fixing the concentrations of carbon, silicon, nickel and the effective total of the carbide forming elements in such a manner that upon solidification of the melt a microstructure is formed which comprises 1.0 to 3.0 vol-% of graphite. In a metallographic section, more than 20 and less than 100 graphite particles are present per mm$^2$ of observed surface. The remainder of the microstructure is composed primarily of martensite, 8 to 35 vol-% of eutectic carbides, and at least 1 vol-% of finely distributed carbides of vanadium, niobium and/or tantalum.

In one aspect of the present method, the mold is a centrifigal casting mold. In another aspect, the body is or is processed into a working or sleeve part of a composite roll comprising a core part and said working or sleeve part.

According to yet another aspect, the body is processed into the composite roll before it is subjected to said heat treatment.

In another aspect, the above microstructure comprises 1.0 to 2.5 vol-% of graphite, more than 22 and less than 100 graphite particles are present per mm$^2$ of observed surface in a metallographic section, and the remainder is composed primarily of martensite, 10 to 25 vol-% of eutectic carbides, and 2 to 20 vol-% of finely distributed carbides of vanadium, niobium and/or tantalum.

In still further aspects of the present method, the concentration ratio of carbon to silicon in the melt is set to a value of not higher than 2.6, e.g., not higher than 2.0, and/or the carbon content of the melt is set to a value of 2.2 to 3.1 wt-%, e.g. to a value of 2.6 to 2.95 wt-%, and/or the silicon content of the melt is set to a value of 1.2 to 1.85 wt-185 wt-%, e.g., to a value of 1.4 to 1.75 wt-%, and/or 0.002 to 0.65 wt-% of aluminum, e.g., 0.005 to 0.04 wt-% of aluminum, is added and dissolved in the melt, and/or the nickel content of the melt is set to a value of 3.51 to 4.7 wt-%, e.g., to a value of 4.15 to 4.6 wt-%, and/or the concentration ratio of molybdenum to chromium in the melt is set to a value of less than 1.0, e.g., to a value of less than 0.8, and/or the concentrations of chromium and molybdenum in the melt are set to values of 1.5 to 1.9 wt-% of chromium and 0.3 to 0.9 wt-% of molybdenum, and/or 1.8 to 3.9 wt-% of vanadium, e.g., 1.9 to 2.9 wt-% of vanadium, is added to the melt and dissolved therein.

According to a further aspect of the present method, subjecting the body to a heat treatment comprises heating from room temperature to a treatment temperature of 400° C. to 500° C., e.g., 460° C. to 480° C., holding at this temperature for at least two hours, e.g., at least 8 hours, and cooling to room temperature. The cooling to room temperature may be followed by a low-temperature treatment.

The present invention further provides a casting material for the working area of indefinite chill rolls. This casting material comprises an alloy of, in wt-%, 2.0 to 3.5 carbon, 1.0 to 2.0 silicon, 0.5 to 2.0 manganese, 1.0 to 3.0 chromium, 3.5 to 4.9 nickel, 0.20 to 29 molybdenum, 0 to 0.65 wt-% of aluminum and more than 0.5 to 5.9 vanadium. The vanadium may in part be replaced, in an amount of less than 0.6 wt-%, by niobium and/or tantalum. The remainder of the alloy comprises iron, accompanying elements and impurities related to the manufacturing process. Furthermore, 1.0 to 3.0 vol-% of graphite is present in the form of particles with a distribution of more than 20 and less than 100 particles per mm$^2$ of polished surface of the alloy.

In one aspect of the present casting material, the alloy comprises 1.8 to 4.9 wt-% of vanadium and 2.2 to 3.1 wt-% of carbon, and 1.2 to 2.5 vol-% of graphite is present in the form of particles with a distribution of more than 22 and less than 90 particles per mm$^2$ of polished surface.

According to further aspects of the present casting material, the alloy comprises 1.2 to 2.5 wt-% chromium, 0.5 to 2.1 wt-% molybdenum and 1.5 to 4.9 wt-% vanadium and/or the concentration ratio of carbon to silicon in the alloy is not higher than 2.6, e.g., not higher than 2.0, and/or the alloy comprises 2.6 to 2.95 wt-% carbon and/or 1.2 to 1.85 wt-% silicon, e.g., 1.4 to 1.75 wt-% silicon, and/or 0.002 to 0.65 wt-% aluminum, e.g., 0.005 to 0.04 wt-% aluminum, and/or 3.5 to 4.7 wt-% nickel, e.g., 4.15 to 4.6 wt-% nickel, and/or the concentration ratio of molybdenum to chromium in the alloy is less than 1.0, e.g., less than 0.8, and/or the alloy comprises 1.5 to 2.01 wt-% chromium and 0.3 to 0.9 wt-% molybdenum and/or 1.8 to 3.9 wt-% vanadium, e.g., 1,9 to 2.95 wt-% vanadium.

According to yet another aspect, the casting material comprises 8 to 35 vol-% of eutectic carbides, e.g., 10 to 25 vol-% of eutectic carbides, and 1 to 15 vol-%, e.g., 2 to 10 vol-%, of carbides of at least one of vanadium, niobium and tantalum.

The present invention also provides a composite indefinite chill roll comprising a core part and a working or sleeve part surrounding the core part. The core part is made of low-alloy cast iron and the working or sleeve part has a thickness of 10 to 150 mm and is made of a casting alloy with little tendency to adhere or weld to the rolling stock, has a Shore C hardness of 70 to 90 and comprises 1.0 to 2.5 vol-% of graphite, 8 to 35 vol-% of eutectic carbides, and 1 to 20 vol-% of uniformly distributed carbides of at least one of vanadium, niobium and tantalum, with the remainder being primarily composed of martensite and constituents related to impurities and the manufacturing process.

In one aspect of the composite indefinite chill roll the graphite is finely dispersed, with a graphite particle count of more than 20 particles per mm$^2$ of polished surface in a metallographic section.

In another aspect, the working or sleeve part comprises 1.0 to 2.5 vol-% of graphite, the latter with a graphite particle count of at least 22 but less than 100 graphite particles per mm$^2$ of polished surface, 10 to 25 vol-% of eutectic carbides and 2 to 10 vol-% of carbides of at least one of vanadium, niobium and tantalum.

According to another aspect thereof, the casting alloy of the working or sleeve part comprises, in wt-%, 2.0 to 3.5 carbon, 1.0 to 2.0 silicon, 0.5 to 2.0 manganese, 1.0 to 3.0 chromium, 3.5 to 4.9 nickel 0.20 to 2.9 molybdenum, 0.002 to 0.65 aluminum and 0.5 to 5.9 vanadium, with the remainder being iron and impurities. The vanadium may in part be replaced, in an amount of less than 0.6 wt-%, by at least one of niobium and tantalum.

According to still another aspect of the present composite indefinite chill roll, the casting alloy of the working or sleeve part comprises, in wt-%, 2.21 to 3.1 carbon, 1.2 to 1.85 silicon, 0.6 to 1.6 manganese, 3.5 to 4.7 nickel, 0.005 to 0.1 aluminum and 1.8 to 3.9 vanadium.

According to yet another aspect, the casting alloy of the working or sleeve part comprises, in wt-%, 2.6 to 2.95 carbon, 1.4 to 1.75 silicon, 0.7 to 1.4 manganese, 1.5 to 2.01 chromium, 4.15 to 4.6 nickel, 0.3 to 0.9 molybdenum, 0.005 to 0.04 aluminum and 1.9 to 2.9 vanadium.

In another aspect the casting alloy of the working or sleeve part may comprise 3.1 to 3.9 wt-% of vanadium, e.g., 3.3 to 3.75 wt-% of vanadium.

In further aspects of the composite indefinite chill roll, the core part is made of ductile iron and/or the binding zone between the working or sleeve part and the core part has, in the radial direction, a bending strength (3-point bending test) of greater than 600 N/mm$^2$.

BRIEF DESCRIPTION OF THE DRAWINGS

The invention is described in detail below using graphs and illustrations of test results as well as a table. Shown are:

FIGS. 3 and 4 unetched photomicrographs

Tab. 1 roll materials and their performance in practical use.

DETAILED DESCRIPTION OF THE INVENTION

Figure 1:
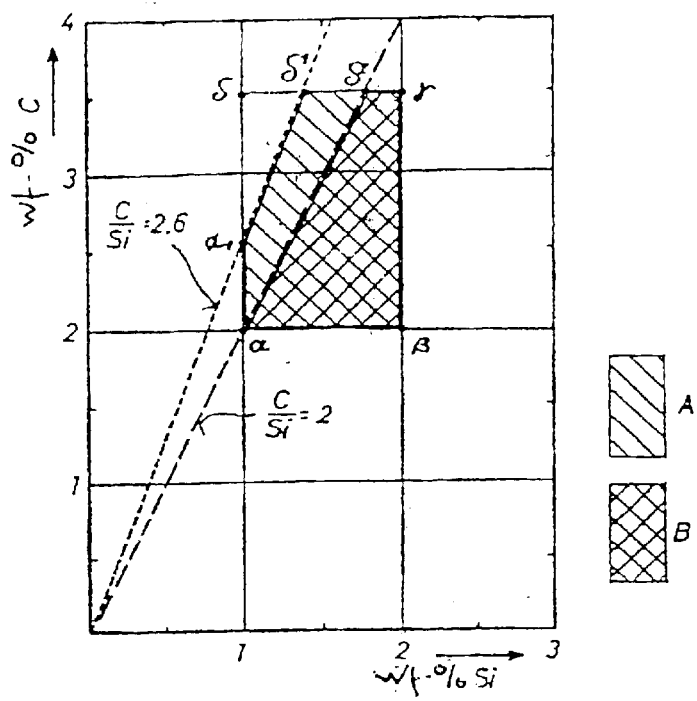
FIG. 1 a graph of C/Si

FIG. 1 shows the concentration of silicon and carbon, where the inventive region is described by the points α, β, γ, δ. Preferred regions with a ratio of C/Si=2.6 (region A) (α, β, γ, $δ^1$, $α^1$) and a ratio of C/Si≦2.0 (region B) (α, β, γ, $δ^2$) are marked.

Figure 2:
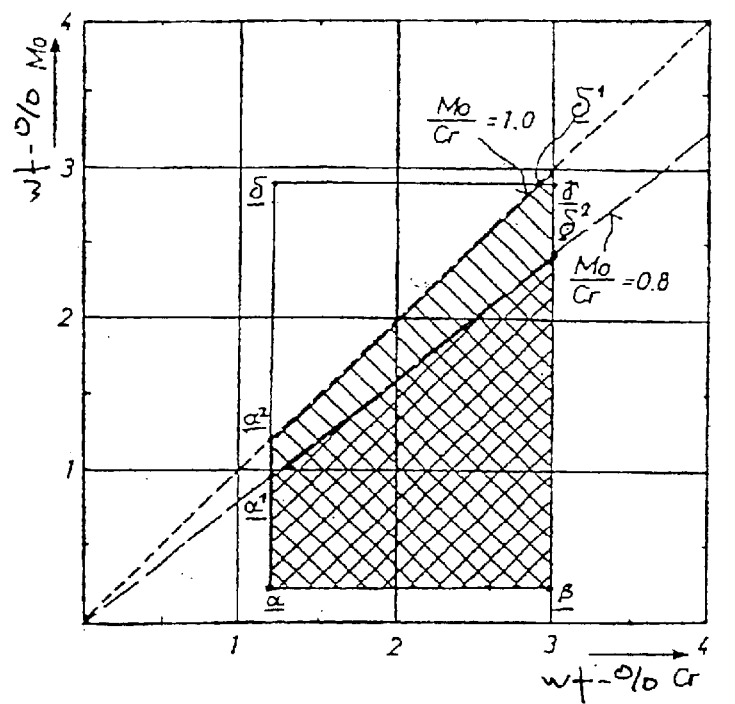
FIG. 2 a graph of Mo/Cr

FIG. 2 shows a graph of molybdenum and chromium in which the ratio region (α, β, γδ) according to the invention of the content is represented. The preferred regions with a ratio of Mo/Cr≦1.0 (region A) (α, β, γ, δ, $δ^1$, $α^2$) and one with Mo/Cr=0.8 (region B) (α, β, γ, δ, $δ^2$, $α^1$) are identified as in FIG. 1.

FIG. 3 shows, in a photomicrograph with 50× magnification, the formation of graphite in a roll material according to the prior art. The roll sleeve had the following chemical composition in wt-%: C=3.09, Si=0.91, Mn=0.84, Cr=1.79, Ni=4.51, Mo=0.38, Al=0.003, graphite content: 3.9 vol-%, 18 graphite particles per $mm^2$. FIG. 4 shows, in a photomicrograph with the same 50× magnification, the large number and uniform distribution of graphite particles in a working area of a roll composed according to the invention. The chemical composition of the working area in wt-% was C=3.02, Si=1.42, Mn=0.9, Cr=1.8, Ni=4.36, Mo=0.52, V=2.9, Al=0.08, graphite content: 2.8 vol-%, 42 graphite particles per $mm^2$.

In comparison to a material according to the prior art, despite a lower carbon content and lower graphite content of the alloy according to the invention, the number of graphite particles was more than twice as large and 3.2 vol-% of vanadium carbides were measured.

Table 1 summarizes the chemical composition of the roll sleeve, the structural composition and the roll performance achieved in practical use for each of 10 roll pairs. The rolls designated A through E, which were manufactured according to prior art, hence were not alloyed with vanadium; the rolls designated F through J were manufactured with a sleeve material alloyed according to the invention.

By means of additional alloying with vanadium (rolls F through N), the formation of hard vanadium carbides with small grain size and largely homogeneous distribution in the material was possible with a reduced proportion of eutectic carbides, by means of which the wear resistance of the material, and finally the roll performance, were significantly improved. A high graphite particle count per $mm^2$, which was achieved through the interactions of the activities of the elements Cr, Si, Ni, Mo, C and V, prevented sticking or welding of the rolling stock to or with the roll surface, even at low graphite proportions. The addition of niobium and tantalum, which is to say of additional elements from group 5 of the periodic system, produced a small increase in the wear resistance and roll performance in operation at contents less than 0.6 wt-%. It is noteworthy that the formation and propagation of cracks, as well as stripping, were significantly reduced in the sleeve material according to the invention, which can probably be attributed to the large number of graphite particles. Microscopic examination demonstrated that the monocarbides MC had small grain sizes and were primarily distributed in finely dispersed form. Since the density of the vanadium carbides is approximately 5.82 g/$cm^3$ at room temperature, on the one hand, and no centrifugal segregation caused by the centrifugal casting was observable on the other hand, we can conclude that the precipitation of special carbides and the fine precipitation of graphite occurred primarily during the eutectic solidification and that primary precipitation was largely inhibited.

TABLE 1

| | Composition of the sleeve | | | | | | | | | | |
|---|---|---|---|---|---|---|---|---|---|---|---|
| Des. | C wt-% | Si wt-% | Mn wt-% | Cr wt-% | Ni wt-% | Mo wt-% | V wt-% | Nb + Ta wt-% | Al wt-% | C/Si | Mo/Cr |
| A | 3.34 | 0.81 | 0.94 | 1.74 | 4.31 | 0.38 | — | — | 0.002 | 4.12 | 0.22 |
| B | 3.27 | 0.84 | 1.04 | 1.73 | 4.3 | 0.38 | — | — | 0.002 | 3.89 | 0.22 |
| C | 3.11 | 0.91 | 0.84 | 1.79 | 4.51 | 0.38 | — | — | 0.003 | 3.42 | 0.21 |
| D | 3.09 | 0.91 | 0.81 | 1.71 | 4.52 | 0.38 | — | — | 0.004 | 3.40 | 0.22 |
| E | 3.32 | 1.02 | 0.78 | 1.75 | 4.4 | 0.4 | — | — | 0.002 | 3.25 | 0.23 |
| F | 2.75 | 1.42 | 0.9 | 1.8 | 4.36 | 0.85 | 2.9 | — | 0.008 | 1.94 | 0.47 |
| G | 2.83 | 1.45 | 0.89 | 1.79 | 4.37 | 0.82 | 2.8 | — | 0.008 | 1.95 | 0.46 |
| H | 3.05 | 1.43 | 0.92 | 1.82 | 4.45 | 1.2 | 2.83 | — | 0.011 | 2.13 | 0.66 |
| I | 2.9 | 1.65 | 0.93 | 1.93 | 4.27 | 0.85 | 3.35 | 0.52 | 0.006 | 1.76 | 0.44 |
| J | 2.93 | 1.71 | 0.95 | 1.85 | 4.28 | 0.35 | 2.75 | 0.35 | 0.012 | 1.71 | 0.19 |
| K | 2.9 | 1.52 | 0.92 | 1.62 | 4.32 | 1.53 | 3.24 | — | 0.009 | 1.91 | 0.94 |
| L | 2.83 | 1.59 | 1.02 | 1.87 | 4.2 | 0.85 | 2.85 | — | 0.015 | 1.78 | 0.45 |
| M | 2.91 | 1.6 | 0.85 | 1.94 | 4.15 | 1.42 | 3.25 | 0.27 | 0.017 | 1.82 | 0.73 |
| N | 2.87 | 1.53 | 0.97 | 1.72 | 4.27 | 1.53 | 3.14 | 0.45 | 0.021 | 1.88 | 0.89 |

| | Structural Composition | | | | | | |
|---|---|---|---|---|---|---|---|
| Des. | carbides, total vol-% | carbides, eutectic vol-% | carbides of group 5 vol-% | graphite portion vol-% | graphite particles per $mm^2$ | hardness ShC | Roll performance t/mm |
| A | 33.2 | 33.2 | 0 | 3.2 | 46 | 75–78 | 3.183 |
| B | 35.1 | 35.1 | 0 | 2.6 | 19 | 76–80 | 3.868 |
| C | 31 | 31 | 0 | 2.8 | 21 | 77–79 | 2.417 |
| D | 28.7 | 28.7 | 0 | 3.9 | 18 | 77–78 | 2.915 |
| E | 29.5 | 29.5 | 0 | 5.3 | 62 | 77–79 | 1.736 |

TABLE 1-continued

| | | | | | | | |
|---|---|---|---|---|---|---|---|
| F | 27.3 | 24.1 | 3.2 | 1.7 | 42 | 76–80 | 6.253 |
| G | 25.8 | 22.9 | 2.9 | 1.9 | 38 | 76–79 | 6.253 |
| H | 26 | 22.7 | 3.3 | 2.8 | 37 | 76–79 | 5.434 |
| I | 21.3 | 14 | 7.3 | 1.8 | 24 | 80–83 | 3.503*) |
| J | 18.7 | 12.7 | 6 | 1.7 | 33 | 76–79 | 6.867 |
| K | 21.4 | 17.2 | 4.2 | 2.3 | 40 | 77–80 | 6.407 |
| L | 21.4 | 18.2 | 3.2 | 1.8 | 27 | 76–78 | 6.684 |
| M | 21.6 | 16.5 | 5.1 | 1.9 | 53 | 80–83 | 6.173 |
| N | 25.7 | 20.4 | 5.3 | 2.2 | 35 | 79–81 | 6.290 |

*) Particularly difficult roll conditions
F, G, H, I, J, K, L, M, N: rolls according to the invention

What is claimed is:

1. A casting material for the working area of indefinite chill rolls comprising an alloy of, in wt-%,

| | |
|---|---|
| 2.0 to 3.5 | carbon |
| 1.0 to 2.0 | silicon |
| 0.5 to 2.0 | manganese |
| 1.0 to 3.0 | chromium |
| 3.5 to 4.9 | nickel |
| 0.20 to 2.9 | molybdenum |
| 0.002 to 0.65 | aluminum and | more than 0.5 to 5.9 vanadium, provided that the vanadium may in part be replaced, in an amount of less than 0.6 wt-%, by at least one of niobium and tantalum, the remainder being iron, accompanying elements and impurities related to the manufacturing process, wherein 1.0 to 3.0 vol-% of graphite is present in the form of particles with a distribution of more than 20 and less than 100 particles per mm$^2$ of polished surface of the alloy.

2. The casting material of claim 1, wherein the alloy comprises 1.8 to 4.9 wt-% of vanadium and 2.2 to 3.1 wt-% of carbon, and wherein 1.2 to 2.5 vol-% of graphite is present in the form of particles with a distribution of more than 22 and less than 90 particles per mm$^2$ of polished surface.

3. The casting material of claim 2, wherein the alloy comprises, in wt-%, 1.2 to 2.5 chromium, 0.5 to 2.1 molybdenum and 1.5 to 4.9 vanadium.

4. The casting material of claim 3, wherein the alloy comprises 2.6 to 2.95 wt-% of carbon.

5. The casting material of claim 4, wherein the alloy comprises 1.4 to 1.75 wt-% of silicon.

6. The casting material of claim 3, wherein the alloy comprises 3.5 to 4.7 wt-% of nickel.

7. The casting material of claim 2, wherein a concentration ratio of carbon to silicon in the alloy is not higher than 2.0.

8. The casting material of claim 7, wherein a concentration ratio of molybdenum to chromium in the alloy is less than 0.8.

9. The casting material of claim 2, wherein the alloy comprises 0.005 to 0.04 wt-% of aluminum.

10. The casting material of claim 2, wherein the alloy comprises 1.5 to 2.01 wt-% of chromium and 0.3 to 0.9 wt-% of molybdenum.

11. The casting material of claim 1, wherein a concentration ratio of carbon to silicon in the alloy is not higher than 2.6.

12. The casting material of claim 11, wherein the alloy comprises 4.15 to 4.6 wt-% of nickel.

13. The casting material of claim 12, wherein the alloy comprises 1.9 to 2.95 wt-% of vanadium.

14. The casting material of claim 1, wherein the alloy comprises 1.2 to 1.85 wt-% of silicon.

15. The casting material of claim 1, wherein a concentration ratio of molybdenum to chromium in the alloy is less than 1.0.

16. The casting material of claim 1, wherein the alloy comprises 1.8 to 3.9 wt-% of vanadium.

17. The casting material of claim 1, wherein the material comprises 8 to 35 vol-% of eutectic carbides and 1 to 15 vol-% of carbides of at least one of vanadium, niobium and tantalum.

18. The casting material of claim 17, wherein the material comprises 10 to 25 vol-% of eutectic carbides.

19. The casting material of claim 17, wherein the material comprises 2 to 10 vol-% of carbides of at least one of vanadium, niobium and tantalum.

20. A composite indefinite chill roll comprising a core part and a working or sleeve part surrounding the core part, wherein the core part is made of low-alloy cast iron and the working or sleeve part has a thickness of 10 to 150 mm and is made of a casting alloy with little tendency to adhere or weld to the rolling stock, has a Shore C hardness of 70 to 90 and comprises 1.0 to 2.5 vol-% of graphite, the latter being finely dispersed with a graphite particle count of more than 20 particles per mm$^2$ of polished surface in a metallographic section, 8 to 35 vol-% of eutectic carbides, and 1 to 20 vol-% of uniformly distributed carbides of at least one of vanadium, niobium and tantalum, with the remainder primarily composed of martensite and constituents related to impurities and the manufacturing process, wherein said working or sleeve part comprises, in wt-%,

| | |
|---|---|
| 2.0 to 3.5 | carbon |
| 1.0 to 2.0 | silicon |
| 0.5 to 2.0 | manganese |
| 1.0 to 3.0 | chromium |
| 3.5 to 4.9 | nickel |
| 0.20 to 2.9 | molybdenum |
| 0.002 to 0.65 | aluminum and |

0.5 to 5.9 vanadium, provided that the vanadium may in part be replaced, in an amount of less than 0.6 wt-%, by at least one of niobium and tantalum, with the remainder being iron and impurities.

21. The composite indefinite chill roll of claim 20, wherein the working or sleeve part comprises 1.0 to 2.5 vol-% of graphite, the latter with a graphite particle count of at least 22 but less than 100 graphite particles per mm$^2$ of polished surface, 10 to 25 vol-% of eutectic carbides and 2 to 10 vol-% of carbides of at least one of vanadium, niobium and tantalum.

22. The composite indefinite chill roll of claim 21, wherein the casting alloy of the working or sleeve part comprises, in wt-%,

| | |
|---|---|
| 2.21 to 3.1 | carbon |
| 1.2 to 1.85 | silicon |
| 0.6 to 1.6 | manganese |
| 3.5 to 4.7 | nickel |
| 0.005 to 0.1 | aluminum and |
| 1.8 to 3.9 | vanadium. |

23. The composite indefinite chill roll of claim 22, wherein the casting alloy of the working or sleeve part comprises 3.3 to 3.75 wt-% of vanadium.

24. The composite indefinite chill roll of claim 21, wherein the casting alloy of the working or sleeve part comprises 3.1 to 3.9 wt-% of vanadium.

25. The composite indefinite chill roll of claim 20, wherein the casting alloy of the working or sleeve part comprises, in wt-%,

| | |
|---|---|
| 2.6 to 2.95 | carbon |
| 1.4 to 1.75 | silicon |
| 0.7 to 1.4 | manganese |
| 1.5 to 2.01 | chromium |
| 4.15 to 4.6 | nickel |
| 0.3 to 0.9 | molybdenum |
| 0.005 to 0.04 | aluminum and |
| 1.9 to 2.9 | vanadium. |

26. The composite indefinite chill roll of claim 20, wherein the core part is made of ductile iron.

27. The composite indefinite chill roll of claim 26, wherein a binding zone working or sleeve part and the core part has, in the radial direction, a bending strength (3-point bending test) of greater than 600 N/mm$^2$.

* * * * *